Dec. 3, 1963
W. W. SULLIVAN
3,113,300
POSITION SENSING APPARATUS
Filed Nov. 12, 1959
3 Sheets-Sheet 1
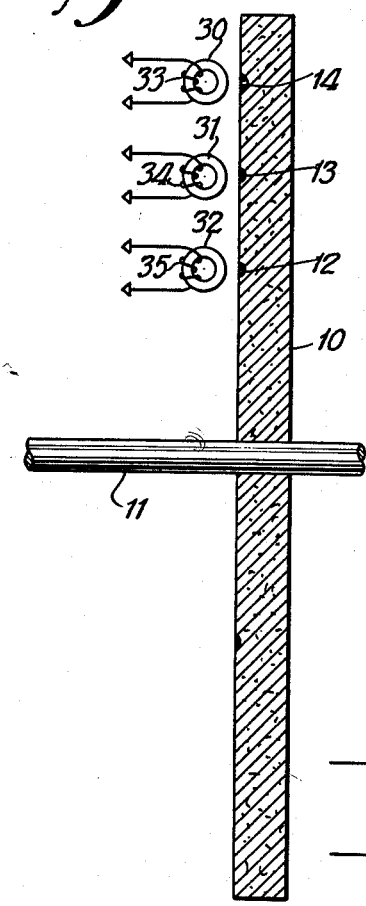
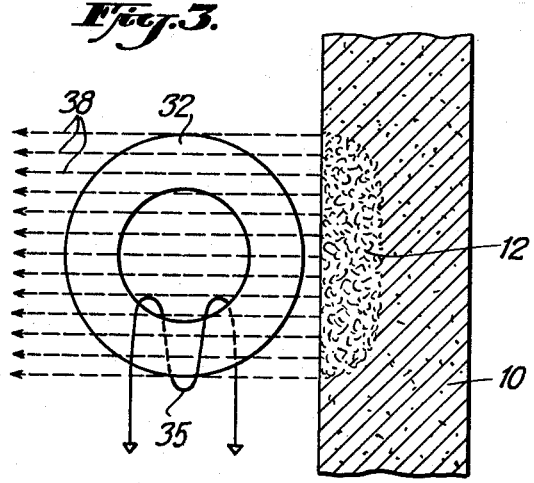
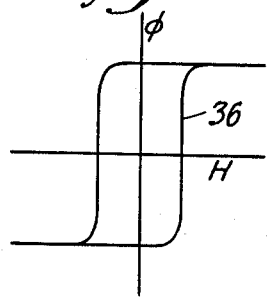
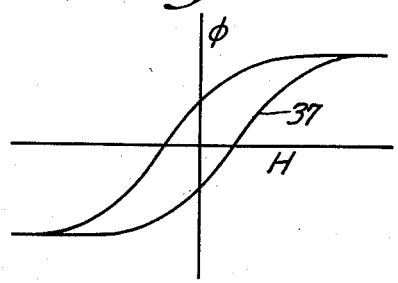
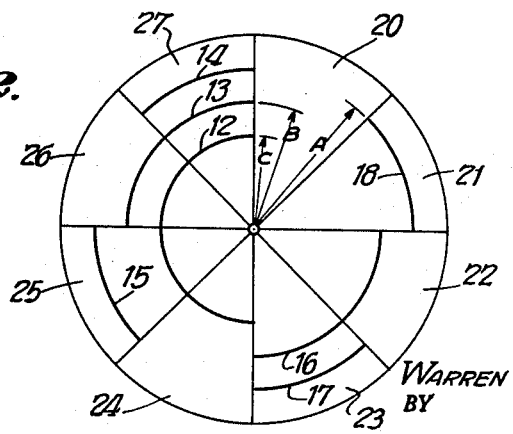
INVENTOR.
WARREN WALTER SULLIVAN.
BY
Ward, Neal, Haselton, Orme & McElhannon
ATTORNEYS.

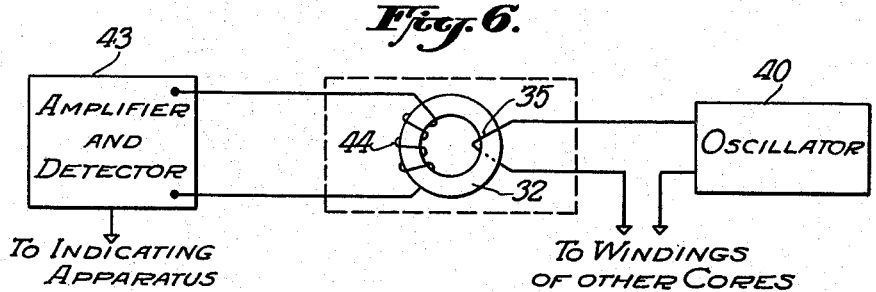
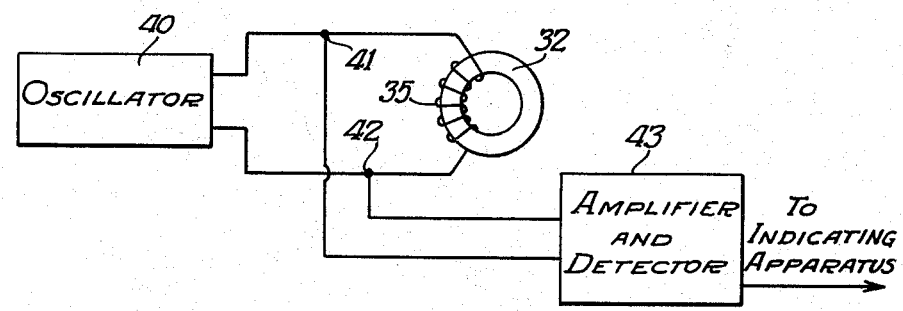
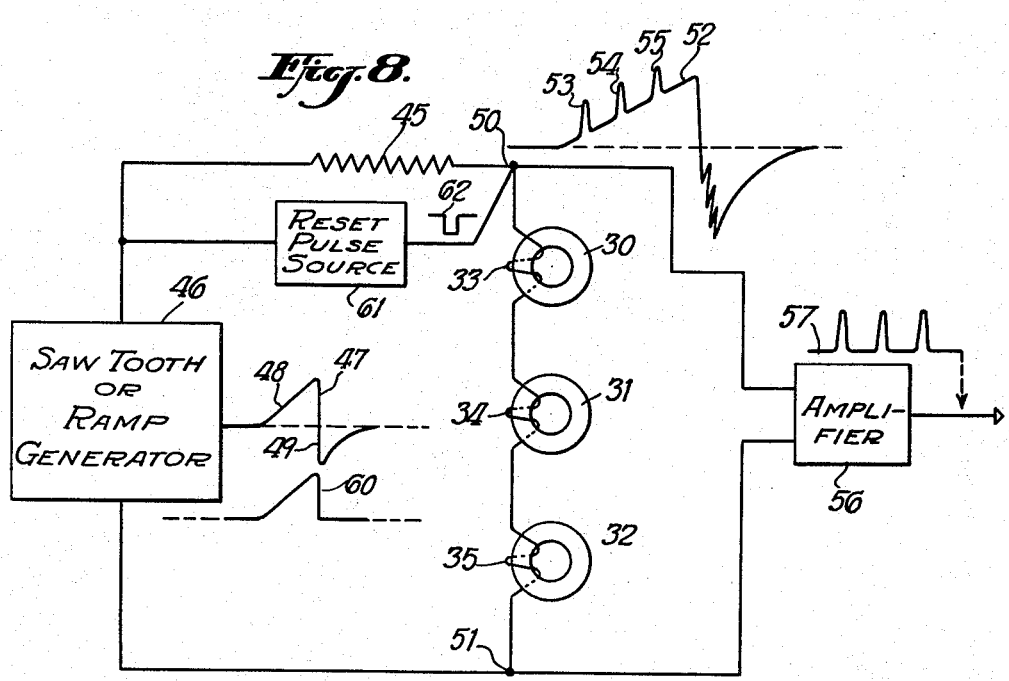
INVENTOR.
WARREN WALTER SULLIVAN.
BY
ATTORNEYS.

Dec. 3, 1963 — W. W. SULLIVAN — 3,113,300
POSITION SENSING APPARATUS
Filed Nov. 12, 1959 — 3 Sheets-Sheet 3
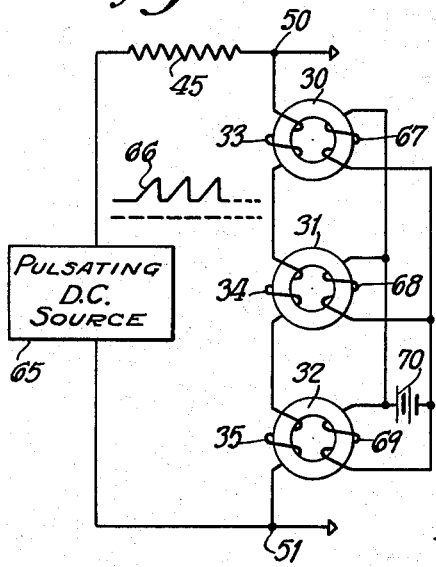
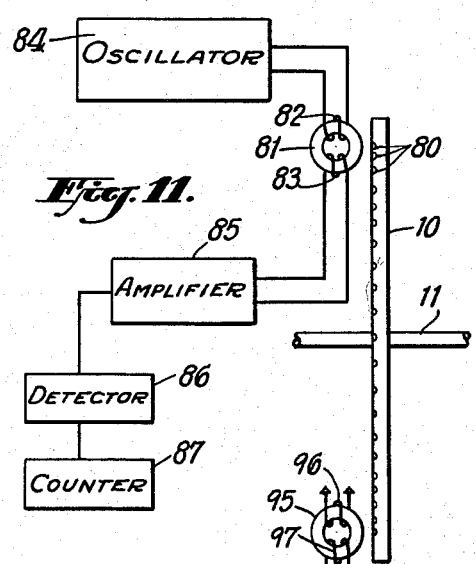
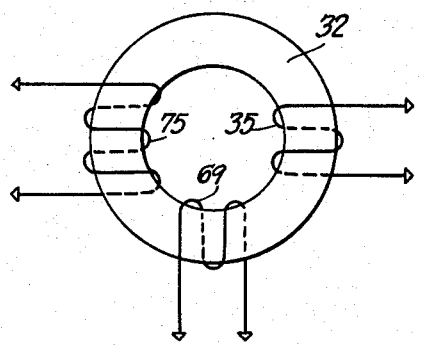
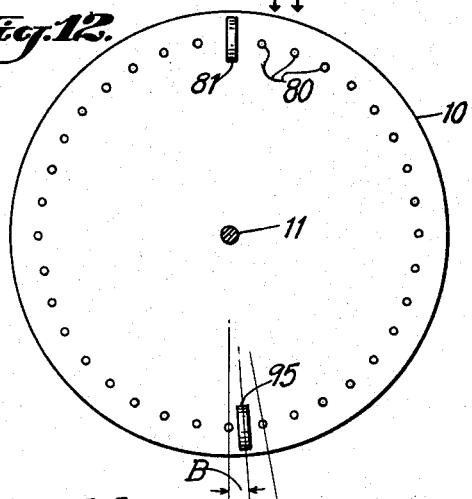
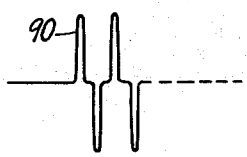
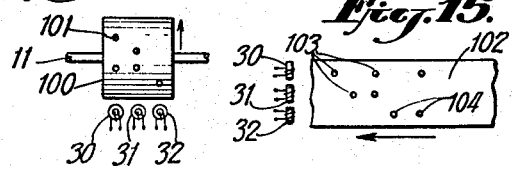
INVENTOR.
WARREN WALTER SULLIVAN.
BY
Ward, Neal, Haselton, Orme & McElhannon
ATTORNEYS.

United States Patent Office 3,113,300
Patented Dec. 3, 1963

3,113,300
POSITION SENSING APPARATUS
Warren Walter Sullivan, Levittown, Pa., assignor to Electro-Mechanical Research, Inc., Sarasota, Fla., a corporation of Connecticut
Filed Nov. 12, 1959, Ser. No. 852,542
15 Claims. (Cl. 340—347)

This invention relates to apparatus for generating electrical signals representing the position of a movable member and particularly to electro-mechanical apparatus for generating coded electrical signals indicative of the position of a movable member whose position is determined by measuring apparatus.

Measuring apparatus having one or more members which are movable to different positions dependent upon the magnitude of the characteristic being measured, e.g. the force, rate, number, etc., are well known, and it is known also to generate electrical signals dependent upon the positions of such members so that other devices may be operated thereby or so that a remote indication of the magnitude may be provided. However, certain known systems are unsatisfactory for many applications because they require mechanical coupling between the measuring apparatus and the signal generating apparatus or because they cannot be readily adapted to operate with existing measuring apparatus. When mechanical coupling is required, the driving force which operates the measuring apparatus may be inadequate and/or the added load may cause errors in the measurement. When space is limited or when the positions of a plurality of members, for example, with a counter having a plurality of cylinders or dials indicate the magnitude of a measurement, certain known systems cannot be employed or cannot be used for remote indication over a single communication channel.

Apparatus for generating electrical signals dependent upon the position of a movable member and which overcomes the above-mentioned difficulties is described in the co-pending application of Howard M. Fleming, Jr., Serial No. 747,142, filed July 8, 1958, now Patent No. 3,045,903 issued on July 24, 1962, and entitled "Magnetic Dial Reading Apparatus." However, such apparatus employs means for producing relative motion between the storage member whose position is to be indicated and a read-out member during the read-out interval. Such motion producing means usually is located near the member whose position is to be indicated, and sometimes, it is difficult to employ such apparatus in locations where space is limited or when size and weight are critical. Furthermore, since the read-out member moves at a speed higher than the storage member, said apparatus is not readily adapted to installations in which the storage member rotates at relatively high speeds.

Systems have heretofore been proposed in which magnetic storage members have magnetized areas arranged thereon in spaced code patterns, and the code patterns are read-out by conventional magnetic pick-up heads each having an air gap adjacent the storage member. In such systems the storage member is rotated at a predetermined speed, and the electrical signals induced in coils associated with the heads by the magnetized areas on the storage member are indicative of the position of the storage member at the time such signals are induced. The magnetic material of the cores of the heads as well as the volume thereof is such that the magnetic characteristics of such cores are substantially unaffected by the magnetic fields of the magnetized areas on the storage member. Such systems have several disadvantages. In the first place, the amplitude of the signals is dependent upon the rate of relative motion between the storage member and the heads, and therefore, one or the other must be moved at the rate required to produce useable signal levels. Accordingly, slow rates of movement cannot be used, and if either is driven by a slow speed or a varying speed measuring device, the other must be driven by some additional means. In the second place, the clearances between the heads and the storage member are critical, and in the third place, if a relatively large output voltage is required, the heads must be mounted close to the storage member, strong magnetization of the storage member areas is required and the coil associated with the head must be relatively large. The latter requirement reduces the number of heads which may be within a given volume and, hence, reduces the resolution which may be obtained with a device of a predetermined size.

Miniature, re-entrant cores of magnetic material and having magnetic characteristics which vary with the magnetizing force are well known. Generally, such cores are toroidal or annular in shape, but they may have other shapes. Various magnetic materials may be employed to make such cores, and they are commonly made of a ceramic ferrite material or of an extremely thin ferromagnetic alloy, wound tape. Relatively small currents through a small number of turns of wire encircling such a core will cause the core to saturate magnetically.

The magnetic characteristics, e.g. permeability, of the above-mentioned re-entrant cores also will vary when they are subjected to an external magnetic field. This effect is employed in the apparatus of the invention which overcomes the disadvantages of the prior art apparatus described above.

For example, if a voltage varying in amplitude, such as a pulsating or alternating voltage, and of sufficient amplitude to drive the core to saturation is applied to the winding or coil of a re-entrant magnetic core, the impedance of the winding or coil will have one value when it is not subjected to a magnetic field from another source or when it is in a weak magnetic field from another source and will have a smaller value when it is subjected to a further magnetic field of sufficient strength. Thus, the impedance of the winding may be varied over a considerable range by varying the magnetic field to which the core is subjected.

Similarly, if the core is provided with two or more windings and a pulsating or alternating voltage is applied to one winding, the voltage developed at the terminals of the other winding or windings may be varied over a relatively large range by varying the magnetic field to which the core is subjected from another source.

In accordance with the present invention, a magnetic core having non-linear magnetic characteristics and having one or more windings thereon, and preferably a plurality of such cores, are associated with a member having means for producing a magnetic field, and preferably a plurality of spaced magnetic fields, in such a manner that relative movement of the member and the core or cores causes the core or cores to be subjected to different magnetic fields. The relative positions of the core or cores and the magnetic field producing member are indicated by the signals produced when a pulsating or alternating, preferably the latter, voltage is applied to the winding or windings of the cores. Preferably, to simplify the application of the voltage to the winding or windings, the core or cores are maintained stationary and the member is moved in accordance with the displacement to be measured, but it will be understood that the core or cores may be moved and the member may remain stationary. Also, it will be apparent from the description of the preferred embodiments of the invention set forth hereinafter that the movement of either member may be relatively slow or fast, regular or irregular, oscillating, unidirectional, circular, linear, etc.

In one preferred embodiment of the invention, a movable magnetic member is magnetized in such a manner that a plurality of groups of magnetized areas are disposed therealong, that is, each group extends transversely to the direction of movement of the member and the groups are side-by-side. The number of groups is selected so as to provide the desired position resolution, a greater number of groups providing greater resolution. The number of magnetized areas in a group depends upon the code selected to distinguish the various groups and also upon the resolution of position of the movable member desired. A plurality of saturable cores, which may, for example, be equal in number to the maximum number of magnetized areas in any group, are mounted adjacent the movable member in positions such that each core may be subjected sucessively to the magnetic field of a magnetized area of the movable member as the member is moved. Accordingly, the magnetic fields to which the cores are subjected at any given time are dependent upon the position of the movable member. Each of the saturable cores has at least one winding thereon and, preferably, an alternating current of relatively high frequency is applied to a winding of each core. If the magnetic field to which a core is subjected is relatively weak, the voltage developed at the terminals of the winding of such core will be relatively large. On the other hand, if a core is immediately adjacent a magnetized area on the movable member, it will be subjected to a magnetic field sufficient to saturate the core and the voltage developed at the terminals of the winding on the core will be relatively small.

In a further preferred embodiment of the invention, a movable magnetic member is provided with a plurality of substantially equally spaced magnetized areas such areas being spaced in the direction of the movement of the member, and at least one saturable core having a winding thereon is mounted adjacent the movable member so that the core is successively subjected to the magnetic field of each magnetized area as the magnetic member is moved. An alternating current of relatively high frequency is supplied to the winding of the core, and when a magnetized area of the movable member is adjacent the core, the voltage at the terminals of the winding is relatively small whereas when the core is intermediate the magnetized areas the voltage at the terminals of the winding is relatively large. Preferably, in this embodiment, in order to indicate direction of movement of the movable member, a second similar saturable core is similarly mounted adjacent the movable member but in a position such that the two cores are not subject to magnetic fields of the same strength at the same time.

It is one object of the invention to provide electrical position indicating apparatus which is simple to construct and manufacture and which does not have the disadvantages of the prior art devices described above.

It is a further object of the invention to provide electrical position indicating apparatus which is simple to assemble and operate, which may be relatively small in size and which need not be driven by mechanical means for read-out purposes.

It is a further object of the invention to provide electrical read-out apparatus which can perform read-out operations at high speeds.

Other objects and advantages of the invention will be apparent from the following detailed description of the preferred embodiments thereof, which description should be considered in conjunction with the accompanying drawings in which:

FIG. 1 is a schematic, side elevation view, partly in cross-section, of one embodiment of the invention;

FIG. 2 is an end elevation view of a portion of the embodiment shown in FIG. 1;

FIG. 3 is an enlarged, fragmentary, side elevation view of a portion of the embodiment shown in FIG. 1;

FIGS. 4 and 5 are hysteresis curves of magnetic cores which may be employed in the apparatus of the invention;

FIGS. 6-9 are schematic diagrams of electrical circuits which may be employed in connection with the position sensing apparatus of the invention;

FIG. 10 illustrates schematically a magnetic read-out core having three windings thereon;

FIG. 11 is a schematic, side elevation view, partly in cross-section of a further embodiment of the invention;

FIG. 12 is an end elevation view, partly in cross-section, of a portion of the apparatus shown in FIG. 11;

FIG. 13 shows graphs of voltage wave forms obtainable with the apparatus of the invention;

FIG. 14 is a schematic showing of an alternate form of a magnetic member which may be employed in the apparatus of the invention; and FIG. 15 is a schematic showing of a further alternate form of a magnetic member which may be employed in the apparatus of the invention.

FIG. 1 illustrates a rotatable member in the form of a disc 10 mounted on a shaft 11. The shaft 11 is rotatable, and hence the disc 10 is rotatable, in relation to the condition to be measured, and therefore, the position of the disc 10 may indicate the magnitude of a force which drives the shaft 11 or the amount that the shaft 11 has been rotated. Since the disc 10 may be relatively small and does not frictionally engage other parts, the disc 10 and the shaft 11 may be rotated easily and at relatively high speeds.

The disc 10 has a plurality of magnetized areas 12–18 at one face thereof and all such areas may have one polarity at such face. On the other hand, if the magnetized areas are sufficiently spaced the areas may have different polarities. The magnetized areas are polarized and disposed so that the magnetic fields thereof extend substantially perpendicularly from the face of the disc 10.

The magnetized areas 12–18 may be formed by strips of magnetized material or small permanent magnets mounted on the face of the disc 10 or embedded in the disc 10. However, in the preferred form of the invention, the disc 10 is formed of a material which may be permanently magnetized in small discrete areas, an example of such material being barium ferrite. Such a disc may be magnetized as illustrated in FIGS. 1 and 2 by subjecting it to an intense, concentrated magnetic field in the areas to be magnetized, for example, by the use of an electromagnet energized by direct current. The magnetized areas may be at least as small as 0.02 inch in diameter, and if adjacent areas are of the same polarity, the spacing between the areas may be of the same order as the diameter of an area. It has been found that fifty magnetized areas per inch may be produced on a barium ferrite disc permitting a resolution of one-fiftieth of an inch with the apparatus of the invention.

In the embodiment illustrated in FIGS. 1–3 the magnetized areas are divided into eight side-by-side groups 20–27, each group extending transversely to the direction of rotation of the disc 10, and in this embodiment, it is possible to determine the angular position of the disc 10 and hence the shaft 11 within 45 degrees. However, it will be understood by those skilled in the art that because the number of magnetized areas in the direction of rotation of the disc 10 may be much greater than that shown in FIG. 2, the disc 10 may be provided with a greater number of areas so as to provide a higher degree of resolution. For example, in one embodiment which has been constructed and tested and in which the external diameter of the disc 10 is approximately two inches it has been possible to provide 256 sectors or groups of magnetized areas and to obtain a resolution of approximately 1.4 degrees.

The magnetized areas 12–18 on the disc 10 are arranged in accordance with a predetermined code or pattern. The particular code or pattern selected depends upon the degree of resolution required and the type of output signals desired. Any code which will meet these requirements may be employed and the magnetized areas shown in FIG. 2 are arranged in accordance with a binary code as shown in the following table:

| Decimal No. | Binary Equivalent | Sector No. | Magnetized Area at Radius | | |
|---|---|---|---|---|---|
| | | | A | B | C |
| 0 | 000 | 20 | No | No | No. |
| 1 | 100 | 21 | Yes | No | No. |
| 2 | 010 | 22 | No | Yes | No. |
| 3 | 110 | 23 | Yes | Yes | No. |
| 4 | 001 | 24 | No | No | Yes. |
| 5 | 101 | 25 | Yes | No | Yes. |
| 6 | 011 | 26 | No | Yes | Yes. |
| 7 | 111 | 27 | Yes | Yes | Yes. |

When a larger number of sectors, and hence a higher degree of resolution, are employed, the number of areas in a group extending transversely to the direction of rotation is larger. For example, when there are 256 sectors or groups, the binary code would contain eight "bits" and therefore the maximum number of magnetized areas in a group would be eight. To reduce the ambiguity to one decimal place, a cyclic reflected binary code or "Gray" code may be used to determine the arrangement of the magnetized areas.

As shown in FIG. 1 a plurality of magnetic cores 30–32 are mounted adjacent the face of the disc 10 having the magnetized areas 12–18 thereon. Each of the cores 30–32 has a winding 33, 34 and 35 thereon. The dimensions of the cores 30–32 are of the same order as the dimensions of the smallest magnetized area. Toroidal cores made of a ferrite material having an outside diameter of 0.050 inch, an internal diameter of 0.030 inch, and a thickness of 0.015 inch have been employed for apparatus of the invention, and such cores have been spaced approximately 0.003 inch from the face of the disc 10.

The number of turns of the windings 33–35 depends upon the operating conditions, such as the frequency of the interrogating signal, the magnetic characteristics of the cores, the magnitude of the read-out signal desired, the circuits employed for read-out, etc. In one embodiment of the invention, each core winding consisted of one turn and with a 500 milliampere alternating current having a frequency in the range of 40 kilocycles per second to 200 kilocycles per second flowing through the windings, a one volt read-out signal was obtained when no magnetized area was immediately adjacent a core and a 60–70 millivolt output signal was obtained when a magnetized area was immediately adjacent thereto.

The magnetic cores which are preferred for the apparatus of the invention, are saturable, re-entrant magnetic cores having a so-called "square loop" hysteresis curve of the type illustrated in FIG. 4. In FIG. 4 the horizontal axis indicates the magnetizing force to which the core is subjected, and the vertical axis indicates the magnetic flux produced within the core. As indicated by the horizontal portions of the hysteresis curve 36 shown in FIG. 4, the core saturates when the magnetizing force exceeds a predetermined value. A core having a hysteresis curve of the type shown in FIG. 4, provides high sensitivity and a relatively large amplitude read-out signal. It will be noted that the permeability of a core having a hysteresis curve of the type shown in FIG. 4 varies widely with relatively small changes in magnetizing force.

It is well known that the impedance of a winding around a magnetic core is dependent upon the permeability of the core, and when the permeability is low, the impedance is low and vice versa. Furthermore, if a magnetic core is provided with two windings, it is known also that the voltage produced at the terminals of one of the windings by currents flowing in the other winding is related to the permeability of the core. Thus, if the permeability is small the induced voltage is small and if the permeability is high, the induced voltage is relatively high. Accordingly, if the permeability of a core is nonlinearly related to the magnetizing force, the impedance of a winding on the core or the voltage induced in a second winding on the core may be varied in magnitude by changing the magnitude of the magnetizing force to which the core is subjected. Therefore, although a core having a hysteresis loop of the type shown in FIG. 4 is preferred, it will be understood by those skilled in the art that a magnetic core having a hysteresis curve of a different shape may also be employed in the apparatus of the invention. For example, the core may have a hysteresis curve of the type indicated at 37 in FIG. 5.

In the apparatus of the invention, the magnetizing force to which a core is subjected is produced not only by an energized winding around the core, but also by a magnetized area on the disc 10. In the preferred embodiment of the invention, in order to obtain a read-out signal of maximum amplitude, the number of turns in the winding on the core and the amplitude of the interrogating or read-out current are selected to drive the core into its region of saturation at the peaks of the current. Also, the strength of the magnetic field produced by a magnetizing area is sufficient to drive the core into its region of saturation when no current is flowing through the winding and when the area is immediately adjacent the core. However, it will be understood that if a smaller difference between the voltage at the terminals of the winding when no magnetized area is immediately adjacent the core and the voltage at the terminals of the winding when a magnetized area is immediately adjacent the core is acceptable, the ampere turns of the current through the winding may be less and/or the strength of the magnetic field of the magnetized areas may be less. In other words, the relationship of permeability of the core to magnetizing force, the amplitude of the interrogating or read-out current, the number of turns of the winding and the strength of the magnetic fields of the magnetized areas should be so selected so as to provide a read-out signal of the desired magnitude. As a practical matter, the simplest and most reliable operation can be obtained with magnetized areas arranged in a binary or similar code pattern when the preferred conditions set forth above are utilized.

FIG. 3 illustrates the core 32, defining a closed loop magnetic circuit, with the magnetized area 12 immediately adjacent thereto. The magnetic field produced by the magnetized area 12 is represented by the lines 38 and it will be noted that the field extends substantially perpendicularly to the face of the disc 10. Consequently, no net magneto-motive force is induced in the closed loop magnetic circuit when the core 32 is being magnetized by the flux emanating area 12. It will be recognized that in practice the field lines are not as straight as is shown in FIG. 3 and considerable curvature of the magnetic field lines can be tolerated. It is sufficient in the preferred embodiment of the invention if the field distribution is such that diametrically opposite portions of the core are saturated by the field produced by the magnetized area. It will be noted that the direction of the field produced by the magnetized area in diametrically opposed portions of the core are in the same direction, and therefore, one portion of the core is always saturated when the core is adjacent a magnetized area regardless of the direction of the field in the core produced by the winding thereon.

With the apparatus illustrated in FIGS. 1–3, the magnetized areas occupy three radial positions on the disc 10. Accordingly, the embodiment shown in FIGS. 1–3 includes three magnetic cores disposed radially with respect to the disc 10. Such cores permit determination by the circuits hereinafter described of the presence or absence of a magnetized area immediately adjacent one of the cores 30–32. If the magnetized areas occupy a different number of radial positions, a corresponding number, that is, a number of cores corresponding to the number of radial positions, would be used and disposed in corresponding radial positions.

FIG. 7 illustrates electrical read-out apparatus for cores having a single winding, such as the core 32 having a winding 35. It will be understood that the windings 33 and 34 of cores 30 and 31 are similarly connected. In FIG. 7 the winding 35 is supplied with an interrogating signal or current from an alternating current source 40 which may, for example, be an oscillator. Preferably, the source 40 has a low impedance output connected to the winding 35, and the frequency of the alternating current which is utilized depends upon the inductance and resistance of the winding 35 as well as the desired amplitude of the read-out signal. When the core 32 is within the magnetic field of a magnetized area, such as the magnetized area 12, the impedance of the winding 35 is substantially equal to its direct current resistance and is negligible. However, when the core 32 is not subjected to the magnetic field of a magnetized area immediately adjacent thereto, the impedance of the winding 35 has a value dependent upon the resistance and inductance of the winding 35 as well as the frequency of the energy of the source 40 and, with a twenty turn winding, may be of the order of fifty to one hundred ohms. Accordingly, when the core 32 is immediately adjacent a magnetized area on the disc 10, the voltage between the terminals 41 and 42 of the winding 35 will be very small, and when the core 32 is not immediately adjacent a magnetized area on the disc 10, the voltage between the terminals 41 and 42 will be relatively large. In the preferred embodiment of the invention, the frequency of the energy of the source 40 is in the radio frequency range and at least 20 kilocycles per second and normally need not be greater than 200 kilocycles per second. As used herein, the term "radio frequency" is intended to refer to frequencies of at least 10 kilocycles per second.

The input of a conventional amplifier and detector 43 is coupled to the terminals 41 and 42 and amplifies and detects the voltage between the terminals 41 and 42. The detector is coupled to the terminals 41 and 42 through an amplifier to provide a higher level signal output but if desired, the amplifier may be omitted, and the detector may be coupled directly to the terminals 41 and 42. The output voltage of the amplifier and detector 43 is a direct current voltage which may be employed to control or operate conventional signal indicating apparatus.

The source 40 may be a continuously operating oscillator connected at all times to the terminals 41 and 42. Alternatively, the oscillator may be turned on or may be connected to the terminals of the core windings only when it is desired to determine the condition of the cores 30-32 and hence the presence or absence of magnetized areas immediately adjacent the cores. Furthermore, since the cores respond rapidly and read-out may be accomplished within a microsecond, the source 40 may comprise a pulsed or gated oscillator, and pulses will be produced at the output of the amplifier and detector 43 even though the disc 10 may rotate slowly or intermittently.

From the foregoing it will be apparent that, when the sector 20 of the disc 10 is adjacent the cores 30-32, each of the amplifiers and detectors corresponding to the amplifier and detector 43 will have pulses or a direct current voltage at the output thereof because there are no magnetized areas adjacent the cores 30-32. However, when the disc 10 rotates so that the sector 21 is adjacent the cores 30-32 there will be substantially no output from the amplifier and detector connected to the winding 33 but pulses or a direct current voltage will be present at the outputs of the amplifiers and detectors connected to the windings 34 and 35. In a similar manner, the outputs of the amplifiers and detectors will vary as the disc 10 is rotated to position different sectors adjacent the cores 30-32 and the outputs of the amplifiers and detectors, jointly considered, will be characteristic of the one of the sectors 20-27 adjacent the cores 30-32. Therefore, by indicating or observing the outputs of the amplifiers and detectors, the position of the disc 10 will be known.

If the cores 30-32 are each provided with two windings the arrangement illustrated in FIG. 6 may be employed to indicate the position of the disc 10. FIG. 6 illustrates the connections of the windings of only one of the cores 30-32, but it will be understood that the windings of other cores are similarly connected. The winding 35 of the core 32 shown in FIG. 6 is connected to the source 40, and the windings 33 and 34 may either be connected in parallel with the windings 35 or in series therewith. A second winding 44 also encircles the core 32 and is connected to the input of the amplifier and detector 43.

When no magnetized area is immediately adjacent the core 32, a voltage will be induced in the winding 44, and a direct current voltage will be present at the output of the amplifier and detector 43. On the other hand, when a magnetized area, such as the area 12, is immediately adjacent the core 32, substantially no voltage will be induced in the winding 44, and therefore, there will be no voltage of significant magnitude at the output of the amplifier and detector 43. Again, when the output voltages of the amplifiers and detectors connected to the second windings of the cores 30-32 are jointly considered, it will be found that they indicate the relative angular position of the disc 10.

FIG. 8 illustrates read-out circuits which may be employed to supply the read-out signals being produced at spaced time intervals. The windings 33, 34 and 35 of the cores 30, 31 and 32 are connected in series and connected through a resistor 45 to a saw tooth or ramp generator 46. In accordance with one method of operation of the circuit shown in FIG. 8, the saw tooth generator 46 has an output voltage wave form of the type illustrated at 47 in FIG. 8, and it will be noted that the wave form has both a portion 48 which increases in one direction or polarity and the second portion 49 which increases in the opposite direction or polarity. The characteristics of the cores 30-32, the turns of the windings 33-35 and the current through the windings 33-35 produced by the generator 46 are selected so that each of the cores 30-32 changes from one remanent magnetic state to the other with magnetizing forces of different magnitude. For example, the core 30 will pass from one remanent magnetic state to the other when the current through the winding 33 has a relatively low value, the core 31 will change from one remanent magnetic state to the other when the current through the winding 34 has a higher value, and the core 32 will change from one remanent magnetic state to the other when the current through the winding 35 has a relatively high value. As each core passes from one remanent state to another the impedance of the associated winding increases momentarily and thereby momentarily increases the impedance between the terminals 50 and 51. If it is assumed that the cores 30-32 initially have the same remanent magnetic polarity and if it is assumed that the current produced through the windings 33-35 by the generator 46 is in a direction which will change the remanent magnetic polarity of the cores 30-32 from such initial polarity to the opposite polarity, then the voltage between the terminals 50 and 51 will have substantially the wave form indicated at 52. When the core 30 changes state it will produce a pulse 53, at a later period of time, the core 31 will produce the pulse 54 and at a still later time the core 32 will produce the pulse 55. An amplifier 56 is connected to the terminals 50 and 51, and the amplifier 56 may be a conventional amplifier which discriminates against voltage changes which occur at a relatively slow rate and which discriminates against voltages of one polarity. With such an amplifier, the output voltage thereof will have the shape indicated at 57 in FIG. 8 when a voltage having the wave form indicated at 52 is applied to the input thereof.

In the foregoing it has been assumed that none of the cores 30–32 is adjacent a magnetized area on the disc 10. If one of the cores 30–32 is immediately adjacent a magnetized area on the disc 10, the corresponding pulse 53–55 would be absent.

After each core has been switched from one state to the other as described above, it must be returned to its initial remanent magnetic state. In the first method of operation of the circuit shown in FIG. 8, the current through the windings 33–35 is reversed due to the portion 49 of the voltage output wave form 47 of the generator 46. Although pulses may be produced by the cores 30–32 during the return of the cores to their initial remanent states, such pulses will be of opposite polarity as indicated at the lower portion of the wave form 52, and therefore, such pulses do not appear at the output of the amplifier 56.

If desired, the wave form of the output voltage of the generator 46 may be of one polarity as illustrated at 60 in FIG. 8. In this method of operation, the pulses 53, 54 and 55 will be produced as before, but it is necessary to return the cores 30–32 to their initial remanent state by other means. The cores 30–32 may be returned to their initial remanent state by means of a pulse generated by a reset pulse source 61 synchronized by the output of the generator 46 so that a pulse 62 of opposite polarity is produced after each saw tooth pulse 60 generated by the generator 46.

An alternative form of read-out circuit which permits the use of a source generating pulse of one polarity and which eliminates a reset pulse source 61 is illustrated in FIG. 9. The pulsating direct current source 65 illustrated in FIG. 9 has an output voltage wave form of the type illustrated at 66 in FIG. 9. Each of the cores 30–32 has a second winding 67–69 thereon and each of the windings 67–69 is connected to a direct current biasing source 70. The number of turns in the windings 67–69, and the magnitude and direction of the currents through such windings 67–69 produced by the direct current source 70 are such that the cores 30–32 have a remanent magnetic polarity of one direction in the absence of current, or with a relatively small current, through the windings 33–35. If desired, the windings 33–35 may have the same number of turns and the windings 67–69 may have unequal numbers of turns so that the cores 30–32 will switch from one remanent magnetic state to another remanent magnetic state with different values of current through the windings 33–35. The operation of the embodiment shown in FIG. 9 is similar to the operation of the embodiment shown in FIG. 8, the terminals 50 and 51 shown in FIG. 9 being connected to an amplifier such as the amplifier 56 shown in FIG. 8, but the switching of the cores 30–32 to their initial remanent magnetic state is accomplished by the corresponding biasing windings 67–69 when the output voltage from the source 65 returns to its minimum value.

If separate channel outputs for the read-out signals are desired in the circuit shown in FIG. 8, each of the cores 30–32 may be provided with second windings thereon, the second windings providing separate output channels for each core. On the other hand, single channel output may be provided by connecting the second windings on the cores in parallel or in series. Similarly, separate channel outputs or single channel output may be provided in the circuit of FIG. 9 by adding a third winding to each of the cores 30–32, FIG. 10 illustrating a third winding on the core 32. The other cores 30 and 31 may be provided with similar third windings.

A further embodiment of the invention is illustrated in FIGS. 11 and 12. The embodiment shown in FIGS. 11 and 12 is simpler than the embodiments shown in FIGS. 1–3 and it is particularly adapted for installations where the shaft 11 and the disc 10 are rotated at relatively high speeds. However, it will be understood that the shaft 11 and the disc 10 may be rotated at slow speeds or intermittently.

In the embodiment shown in FIGS. 11 and 12, the disc 10 is provided with a plurality of equally spaced magnetized areas 80 which are all spaced at an equal distance from the axis of rotation of the disc 10. A saturable, re-entrant magnetic core 81, of the type described above, is mounted adjacent the face of the disc 10 in position to be saturated by the magnetic field of the magnetized area 80 immediately adjacent thereto. The core 81 is provided with a pair of windings 82 and 83 and the winding 82 is an input winding connected to a source of alternating current as to an oscillator 84. Preferably, the frequency of the alternating current of the source 84 is in the range from 40–200 kilocycles per second and the amplitude of the alternating current is sufficient to drive the core 81 into its region of saturation at peaks of the current of opposite polarity. Preferably, also the strength of the magnetic fields of the magnetized areas is sufficient to drive the core 81 into its region of saturation when such a magnetized area 80 is immediately adjacent to the core 81.

The output winding 83 is connected to an amplifier 85 and the amplifier 85 is connected in turn to a detector 86. The output of the detector 86 is connected to the input of a counter or integrating device 87.

The operation of the embodiment illustrated in FIGS. 11 and 12 is similar to the operation of the apparatus described in connection with FIG. 6. Thus, when there is no magnetized area 80 immediately adjacent the core 81 a voltage having a wave form of the type illustrated at 90 in FIG. 13 is supplied to the input of the amplifier 85, and the voltage output of the detector 86 has the wave form illustrated at 91 in FIG. 13. However, when a magnetized area 81 is immediately adjacent the core 81 there is substantially no output voltage at the terminals of the winding 83 and therefore, the output of the detector 86 is substantially zero. Accordingly, as the disc 10 is rotated, the voltage at the terminals of the winding 83, and hence at the output of the detector 86, alternately increases to its maximum value and decreases substantially to zero providing a series of spaced voltage pulses at the output of the detector 86. By counting the number of such pulses in a counter 87 the position of the disc 10 with respect to a base or starting position may be indicated by the counter 87. Similarly, by integrating the number of pulses supplied to the counter 87 over a period of time the embodiment of FIGS. 11 and 12 may be utilized to indicate the speed of rotation of the disc 10.

In some installations it may be desirable to indicate the sense or direction of rotation of the disc 10, and for such installations the embodiment shown in FIGS. 11 and 12 would be provided with a second saturable, re-entrant magnetic core 95 having a pair of windings 96 and 97. In such an installation, the input winding 96 is connected to the output of the oscillator 84 and the output winding 97 as well as the winding 83 of the core 81 are connected to a conventional phase indicating device.

The core 95 is displaced with respect to the core 81 so that the output signals from the winding 97 are electrically displaced in phase with respect to the signals at the output of the winding 83. In other words, the cores 81 and 95 are positioned so that they are not subjected to the same magnetic fields by magnetized areas 80 at the same time. As illustrated in FIG. 12, the core 95 and the core 81 are disposed adjacent approximately diametrically opposite portions of the disc 10, but the core 95 is displaced with respect to the diametrically opposite portion of the disc 10 a distance "B" which is some fraction of the distance "A" between the corresponding points on magnetized areas 80. For example, the distance "B"

may be substantially one-quarter of the distance "A." If the spacing "B" is approximately one-quarter of the distance "A" the signals produced at the winding 97 will be displaced approximately 90 degrees from the pulses produced at the winding 83, the signals appearing at the terminals of the winding 97 ahead of or after the signals appearing at the terminals of the winding 83, depending upon the direction of rotation of the disc 10.

Although the core 95 has been shown in a position approximately diametrically opposite the core 81, it will be apparent that other relative positions may be employed as long as the cores 81 and 95 are not subjected to the same magnetic fields by the magnetized areas 80 at the same time.

Although the magnetized areas are formed on a disc of magnetic material in the preferred embodiments of the invention, it will be apparent to those skilled in the art that different configurations may be employed for the magnetic member bearing the magnetized areas. For example, as illustrated in FIG. 14, the magnetic member may be a cylinder or drum 100 having magnetized areas 101 on the surface thereof, the drum 100 being driven by the shaft 11. Also, the magnetic member may be in a form of a plate, sheet or tape 102 of magnetic material as illustrated in FIG. 15. The plate 102 has magnetized areas 103 thereon, and the plate 102 may be moved in the direction of the arrow 104 by any conventional means. Alternatively, the plate 102 may be maintained stationary, and the magnetic cores 30–32 may be moved with respect to the plate 102 by any conventional means, connections to the movable cores 30–32 being made in a conventional manner.

It will be apparent from the foregoing description of the preferred embodiment of the invention that there is substantially no load on the shaft 11 produced by the position sensing apparatus, the shaft 11 being loaded only by the bearings therefor which may be relatively friction free. Due to the nature and disposition of the magnetic cores as well as the relatively low magnetic fields required for the magnetized areas, the magnetic drag on the disc 10 is substantially negligible. Because the magnetic fields of the magnetized areas extend in the same direction through diametrically opposite portions of the magnetic cores, no pulses or voltages are induced in the windings of the cores when the disc 10 is rotated and hence no spurious pulses are generated regardless of the speed of rotation of the disc 10. Furthermore, it will be noted that the amplitude of the pulses produced for read-out purposes is independent of the speed of rotation of the disc 10 and is substantially constant. Although the apparatus of the invention is advantageous also when the disc 10 is rotated at relatively high speeds, the generation of a constant amplitude output pulse regardless of speed of rotation is of particular advantage when the disc 10 is rotated at relatively low speeds because useable pulses are obtained even though the speed of rotation is relatively low.

Having thus described my invention with particular reference to the preferred forms thereof and having shown and described certain modifications it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. In a position sensing apparatus,
a first member having a plurality of magnetic flux emanating areas arranged in a coded pattern, each of said areas defining a concentration of flux of a predetermined polarity,
said pattern comprising groups of areas representative of distinct predetermined positions;
core members mounted opposite to said first member, each core member being composed at least in part of magnetic material having at least two remanent states,
at least a portion of each of said core members being susceptible of becoming substantially saturated by respective ones of said flux emanating areas dependent upon the relative positions of said core members and said flux emanating areas;
said first member and said core members being susceptible of relative displacements whereby said core members are positioned with respect to certain of said areas dependent upon said relative displacements;
flux inducing means coupled with each of said core members for switching the magnetic material in said core members between said remanent states dependent upon the relative positions of said core members and said first member;
and output means responsive to the flux in said core members for providing signals representative of said predetermined positions.

2. In a position sensing apparatus,
magnetic flux generating means for providing a plurality of magnetic fields arranged in a predetermined pattern, each of said fields including a magnetic flux of a predetermined polarity,
said pattern comprising groups of fields representative of distinct predetermined positions;
core members mounted opposite to said flux generating means,
each core member being composed at least in part of magnetic material having at least two remanent states,
at least a portion of said material in each of said core members being susceptible of becoming substantially saturated by respective ones of said fields dependent upon the relative positions of said core members and said fields;
said means and said core members being susceptible of relative displacements whereby said core members are positioned with respect to certain of said fields dependent upon said relative displacements;
flux inducing means coupled with each of said core members for switching the magnetic material in said core members for switching the magnetic material in said core members between said remanent states dependent upon the relative positions of said core members and said flux generating means;
and output means responsive to the flux in said core members for providing signals representative of said predetermined positions.

3. In a position sensing apparatus,
a first member having a plurality of magnetic flux emanating areas arranged in a coded pattern, each of said areas defining a concentration of flux of a predetermined polarity,
said pattern comprising groups of areas representative of distinct predetermined positions;
core members mounted opposite to said first member,
each core member comprising a closed loop magnetic circuit and being composed at least in part of magnetic material having at least two remanent states,
at least a portion of said magnetic material in each of said core members being susceptible of becoming substantially saturated by respective ones of said flux emanating areas dependent upon the relative positions of said core members and said flux emanating areas;
said first member and said core members being susceptible of relative displacements whereby said core members are positioned with respect to certain of said areas dependent upon said relative displacement;
flux inducing means coupled with each of said core members for switching the magnetic material in said core members between said remanent states dependent upon the relative positions of said core members and said first member;

and output means responsive to the flux in said core members for providing signals representative of said predetermined positions.

4. In a position sensing apparatus;

magnetic flux generating means for providing a plurality of magnetic fields arranged in a predetermined pattern, each of said fields including a magnetic flux of a predetermined polarity, said pattern comprising groups of fields representative of distinct predetermined positions;

core members mounted opposite to said flux generating means, each core member comprising a closed loop magnetic circuit and being composed at least in part of magnetic material having at least two remanent states, at least a portion of said material in each of said core members being susceptible of becoming substantially saturated by respective ones of said fields dependent upon the relative positions of said core members and said fields;

said means and said core members being susceptible of relative displacements whereby said core members are positioned with respect to certain of said fields dependent upon said relative displacements;

flux inducing means coupled with each of said core members for switching the magnetic material in said core members between said remanent states dependent upon the relative positions of said core members and said flux generating means;

and output means responsive to the flux in said core members for providing signals representative of said predetermined positions.

5. In a position sensing apparatus, a first member having on at least one face thereof a plurality of magnetic flux emanating areas arranged in a coded pattern, each of said areas defining a concentration of flux of a predetermined polarity, said pattern comprising groups of areas representative of distinct predetermined positions;

core members mounted adjacent to said face but spaced therefrom and being disposed transversally to said face, each core member being composed at least in part of magnetic material having at least two remanent states, at least a portion of each of said core members being susceptible of becoming substantially saturated by respective ones of said flux emanating areas dependent upon the relative positions of said core members and said flux emanating areas;

said first member and said core members being susceptible of relative displacements whereby said core members are positioned with respect to certain of said areas dependent upon said relative displacements;

flux inducing means coupled with each of said core members for switching the magnetic material in said core members between said remanent states dependent upon the relative positions of said core members and said first member;

and output means responsive to the flux in said core members for providing signals representative of said predetermined positions.

6. In a position sensing apparatus, a first member having on at least one face thereof a plurality of magnetic flux emanating areas arranged in a coded pattern, each of said areas defining a concentration of flux of a predetermined polarity, said pattern comprising groups of areas representative of distinct predetermined positions, the arrangement of the areas in each group being different from the arrangment of the areas in the remaining groups;

core members mounted adjacent to said face but spaced therefrom, each core member comprising a re-entrant portion and being composed at least in part of magnetic material having at least two remanent states;

at least a portion of each of said core members being susceptible of becoming substantially saturated by respective ones of said flux emanating areas dependent upon the relative positions of said core members and said flux emanating areas;

said first member and said core members being susceptible of relative displacements whereby said core members are positioned with respect to certain of said areas dependent upon said relative displacements;

flux inducing means coupled with each of said core members for switching the magnetic material in said core members between said remanent states dependent upon the relative positions of said core members and said first member;

and output means responsive to the flux in said core members for providing signals representative of said predetermined positions.

7. In a position sensing apparatus, magnetic flux generating means for providing a plurality of magnetic fields arranged in a predetermined pattern, each of said fields including a magnetic flux of a predetermined polarity, said pattern comprising groups of fields representative of distinct predetermined positions;

core members disposed adjacent to but spaced from said flux generating means, each core member being composed at least in part of magnetic material having at least two remanent states, at least a portion of said core members being susceptible of becoming substantially saturated by respective ones of said fields dependent upon the relative positions of said core members and said fields;

said means and said core members being susceptible of relative displacements whereby said core members are positioned with respect to certain of said fields dependent upon said relative displacements;

flux inducing means including at least one winding coupled with each of said core members for switching the magnetic material in said core members between said remanent states dependent upon the relative positions of said core members and said means, whereby the impedance of each winding having a relatively high value when its core is intermediate said fields and a relatively low value when it is within one of said fields, and output means responsive to the flux in said core members for providing signals representative of said predetermined positions.

8. In an encoder, a first member having on at least one face thereof a plurality of magnetic flux emanating areas, said face being substantially unmagnetized intermediate said areas, said areas being arranged in a coded pattern, each area defining a concentration of flux of a predetermined polarity, said pattern comprising groups of areas representative of distinct predetermined positions;

core members mounted adjacent to said face, each core member being composed at least in part of magnetic material having at least two remanent states, at least a portion of each of said core members being susceptible of becoming substantially saturated by respective ones of said flux emanating areas dependent upon the relative positions of said core members and said flux emanating areas;

said first member and said core members being susceptible of relative displacements whereby said core members are positioned with respect to certain of said areas dependent upon said relative displacements;

flux inducing means coupled with each of said core members for switching the magnetic material in said core members between said remanent states dependent upon the relative positions of said core members and said first member;

and output means responsive to the flux in said core members for providing signals representative of said predetermined positions.

9. In a digital encoder, a first member having on at least one face thereof a plurality of magnetic flux emanating areas, said face being substantially unmagnetized intermediate said areas, said areas being arranged in a coded pattern, each area defining a concentration of flux of a predetermined polarity, said pattern comprising spaced tracks of magnetized areas, each track representing a distinct order of a digital code, whereby groups of areas are representative of distinct predetermined positions;

re-entrant core members mounted adjacent to said first member, at least one core for each track, each core member being composed at least in part of magnetic material having at least two remanent states, at least a portion of each of said core members being susceptible of becoming substantially saturated by respective ones of said flux emanating areas dependent upon the relative positions of said core members and said flux emanating areas;

said first member and said core members being susceptible of relative displacements whereby said core members are positioned with respect to certain of said areas dependent upon said relative displacements;

flux inducing means coupled with each of said core members for switching the magnetic material in said core members between said remanent states dependent upon the relative positions of said core members and said first member;

and output means responsive to the flux in said core members for providing signals representative of said predetermined positions.

10. In a digital encoder, a first member having on at least one surface thereof a plurality of magnetic flux emanating areas, said face being substantially unmagnetized intermediate said areas, said areas being arranged in a coded pattern, each area defining a concentration of flux of a predetermined polarity, said pattern comprising tracks of magnetized areas, each track representing a distinct order of a digital code, whereby groups of areas are representative of distinct predetermined positions;

core members disposed adjacent to said surface and opposite said tracks, at least one core member for each track, each core member being composed at least in part of magnetic material having at least two remanent states, at least a portion of each of said core members being susceptible of becoming substantially saturated by respective ones of said flux emanating areas dependent upon the relative positions of said core members and said flux emanating areas;

means including a shaft for imparting relative displacements between said first member and said core members whereby said core members are positioned with respect to certain of said areas dependent upon said relative displacements;

flux inducing means coupled with each of said core members for switching the magnetic material in said core members between said remanent states dependent upon the relative positions of said core members and said first member;

and output means responsive to the flux in said core members for providing signals representative of said predetermined positions.

11. The digital encoder of claim 10 wherein said first member is a disc, said tracks are concentric with the axis of said shaft, each of said core members defines a gapless, closed-loop, magnetic circuit, and said flux inducing means include at least one interrogating winding on each of said core members.

12. The digital encoder of claim 10 wherein said first member is a drum, each of said core members defines a gapless, closed-loop, magnetic circuit, and said flux inducing means include at least one interrogating winding on each of said core members.

13. The digital encoder of claim 10 wherein said output means include at least one read-out winding on each core member for intercepting the flux in the core, whereby said read-out windings have relatively large amplitude signals induced therein except when said core members are opposite said flux emanating areas.

14. The digital encoder of claim 10 wherein said shaft axially supports and rotates said first member with said surface in closely spaced tangential relation to the periphery of each core member.

15. The digital encoder of claim 10 wherein said flux inducing means include an interrogating winding, said output means include a read-out winding, and said encoder further including biasing means coupled with said core members for selectively controlling the remanent state of the magnetic material in said core members.

References Cited in the file of this patent

UNITED STATES PATENTS

| | | |
|---|---|---|
| 2,575,342 | Gridley | Nov. 20, 1951 |
| 2,740,110 | Trimble | Mar. 27, 1956 |
| 2,765,459 | Winter | Oct. 2, 1956 |
| 2,789,224 | Leonard | Apr. 16, 1957 |
| 2,855,585 | Quinby | Oct. 7, 1958 |
| 2,901,549 | Serrell | Aug. 25, 1959 |
| 2,933,718 | Arsenault | Apr. 19, 1960 |
| 2,933,721 | Hagopian | Apr. 19, 1960 |
| 2,938,198 | Berman | May 24, 1960 |
| 2,938,199 | Berman | May 24, 1960 |
| 2,942,252 | Wolff | June 21, 1960 |

FOREIGN PATENTS

| | | |
|---|---|---|
| 1,136,335 | France | Dec. 29, 1956 |

OTHER REFERENCES

Publication I: A Phonic Wheel Generator for Position Indication in Digital computer Magnetic Drum Storage, by D. R. Quested et al., Journal of Scientific Instruments, October 1954, pages 357–360.